April 24, 1934. M. H. SIDEBOTHAM 1,956,228
FLAT BED CUTTING AND CREASING PRESS
Filed March 16, 1932 10 Sheets-Sheet 8

Inventor
Melvin H. Sidebotham
by O. W. Harrison
Attorney

April 24, 1934.  M. H. SIDEBOTHAM  1,956,228

FLAT BED CUTTING AND CREASING PRESS

Filed March 16, 1932  10 Sheets-Sheet 10

Patented Apr. 24, 1934

1,956,228

UNITED STATES PATENT OFFICE 1,956,228

FLAT BED CUTTING AND CREASING PRESS

Melvin H. Sidebotham, West Newton, Mass., assignor to Specialty Automatic Machine Company, Chelsea, Mass., a corporation of Massachusetts Application March 16, 1932, Serial No. 599,165

18 Claims. (Cl. 93—58)

This invention relates to mechanism for cutting and creasing sheet material, and refers particularly to machines for making paper box blanks from suitable material such as box board.

Heretofore, so far as I am aware, there have been three ways of producing cut and creased articles such as box blanks. One machine employs a flat die and a flat make-ready platen. Such machine and the method of using it is slow, and the machine must be of great strength and the parts very rigid, to enable it to be successfully operated. It is not reliable because up to the present time no really successful automatic feed for such machine has been produced.

Another type of machine employs a rotary cylindrical die carrier and a cylindrical make-ready. Such machines can only be operated profitably when the runs are long ones, because such rotary die carrier must be provided with dies which are curved to correspond with the surface of the cylinder, and such curved dies are expensive to make and difficult to affix properly and relatively to a cylinder; and such machines are commercially profitable only when the runs of the goods are very extensive. The present invention enables straight die members to be used, which die members are easily and quickly mountable on a flat surface. Therefore the present improved machines are very useful when the runs are short ones.

There are two other, somewhat analogous, machines which employ a cylinder and a reciprocating flat bed, the latter carrying the dies, and the cylinder carrying the make-ready and the sheet to be cut. In one such machine, the bed makes two reciprocations and the cylinder makes two revolutions for each sheet of material acted upon, the first revolution to actually cut and crease the sheet, and the second revolution to deliver the sheet. Such machines are, obviously, slow in producing the work as compared with my improved machine as will be clear from the description to be given of the present invention.

In the other analogous type of machine, the cylinder makes but one revolution, but said cylinder is extremely large to provide one area for the sheet and another area which effects no operation during the return of the flat bed.

One of the objects of my invention is to provide a cutting and creasing machine which employs a much smaller cylinder than heretofore, such small cylinder enabling work to be produced at a faster speed than is possible with a machine employing a large cylinder only a portion of which coacts with the bed.

Another object of my invention is to provide a cutting and creasing machine in which the sheet is automatically delivered to a reciprocating bed while the latter is in retracted position, and is delivered therefrom, finished, at the end of its forward movement, accurate registration being automatically effected.

Another object of my invention is to provide a machine of the character referred to, in the operation of which one reciprocating member which carries the cutting and creasing dies also carries the material that is to be cut and creased.

With the above stated objects in view, and others hereinafter explained, the invention consists in the construction of the machine and the combinations of parts thereof, substantially as hereinafter described and claimed.

Of the accompanying drawings:—

Figure 7 is a perspective view of the platen assembly, roll carriage and rails, each unit being slightly raised from its normal position, for illustrative purposes.

Similar reference characters designate similar parts or features in all of the views.

In the particular embodiment of the invention chosen for illustration, the frame of the machine comprises a base 20, and right and left hand side members 21 and 22 respectively. A pulley 23 (Fig. 4) is carried by a shaft 24 having suitable bearings in the side frame 21 and in an outer support 25, said shaft and its pulley serving as the means for driving the machine from any suitable source of power. The said pulley is connected to the shaft 24 by a clutch 26 which is operable by suitable lever mechanism not necessary to describe. A pinion 27 is carried by the shaft 24 inside the frame member 21 and engages a gear 28 carried by a counter-shaft 29, the latter extending transversely of the machine and journalled in the side frame member 21 and brackets 34. A pair of similar pinions 30 (Figs. 2, 4, 5 and 6) on the shaft 29 drive two alined shafts 32 and 33 through the medium of gears 31. The inner portions of the shafts 32, 33, are supported by brackets 34 mounted on the base 20.

The inner ends of the shafts 32, 33, are provided with arms 35 which are connected by a pin or bolt 36 on which is mounted a split block 37 slidable in a slot 38 in an arm 39 pivotally supported at 40. This structure provides a crank 35, 37, intermediate the ends of the shafts 32, 33, so that when rotation is imparted to said shafts by the described gearing, oscillation is thereby imparted to the arm 39 to effect reciprocation of the platen presently described. This oscillation is so proportioned that the stroke in one direction and the corresponding movement of the platen is effected in about one-third of the total time of one complete rotation of the shafts 32, 33, and of course the arm 39 comes to a practical stand-still at each end of its stroke.

The upper end of the arm 39 is forked and connected by two links 39a to pins 41 mounted in webs of the bed or platen 42 which carries the usual chase 43 for removably supporting such cutting and creasing dies as are needed for the particular work to be done by the machine. The chase is clamped to the platen between bevel cleat members 45 and an integral rib 44 of the platen (Fig. 7). The cleats are removable and are held in place by suitable bolts. The platen has, also, three integral runners 46 which travel on rolls 48 mounted in four longitudinal strips 47 (Figs. 3 and 7) extending longitudinally of the machine. The strips 47 are connected by cross braces 49. Carried by the outside strips 47 are brackets 50 (Figs. 4 and 5) each of which carries a gear 51 which engages a rack 52 secured to the under side of the platen 42. The three rows of rolls 48 operate in grooves 53 formed in the three rails 54 (Figs. 4 and 7) said rails forming the stationary bed; they are supported by cross beams 55 mounted in the side frame members of the machine. The strips 47 and their connecting braces 49 provide a reciprocating carriage.

Figure 9:
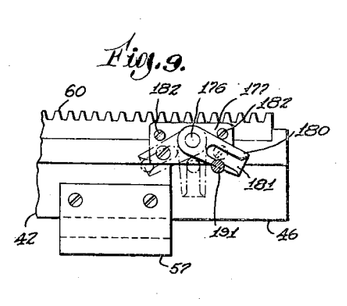
Figure 9 represents a section on line 9—9 of Figure 8.

Extending upwardly and outwardly from the two outside rails 54 are ribs 56 (Figs. 3, 4, 5 and 6) which engage guide blocks 57 bolted to the sides of the platen 42 (Fig. 9). Said blocks guide the platen and maintain its relationship to the bed rails 54. Along the inner sides of the two outer rails 54 are racks 58, supported by angle brackets 59. Since the gears 51 engage the stationary racks 58 and also the racks 52 of the platen, when the platen reciprocates its full stroke, the carriage 47 reciprocates a lesser distance.

Figure 4:
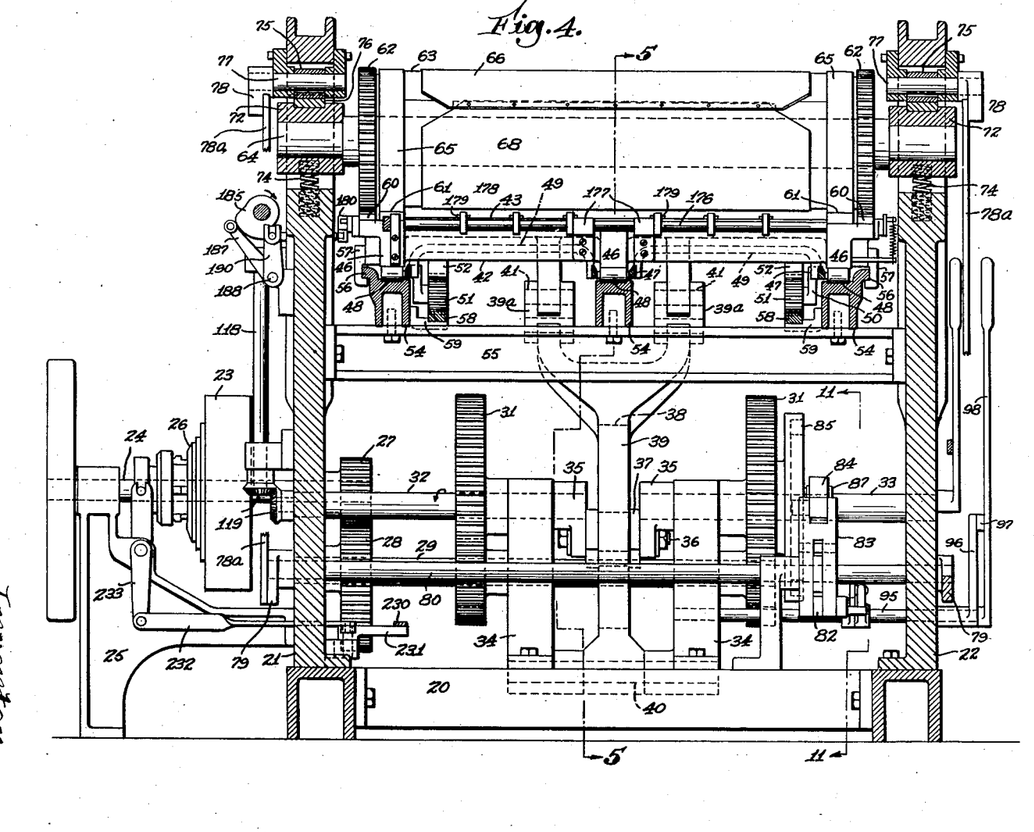
Figure 4 represent a cross section on the line 4—4 of Figure 2.

Carried by the platen each side of the chase are racks 60 and two rails 61 (Figs. 4 and 7). The racks 60 mesh with gears 62 carried by the drum 63 mounted on a shaft 64. The said drum has disc bands 65 adjacent to the gears 62 and located over the tracks 61 to limit the proximity of the drum 63 to the cutting and creasing dies mounted on the chase 43, thereby preventing damage to the dies.

Stretched around the drum 63 between the discs 65 is a sheet metal blanket 66 (Figs. 4, 5, 6 and 12) to which is glued the usual card board that backs up the blank that is being cut or creased. Said card board is, of course, then operated upon in the usual way to constitute what is commonly known as the "make ready", so that the drum or cylinder will present means necessary for coaction with the dies carried by the bed or platen 42 to properly effect cutting and creasing. Said blanket is hooked over pins 67 at one extreme, and extends slightly more than one-half around the periphery of the drum, the other edge of the blanket having riveted thereto, as at 67', a strap which is enclosed in a canvas loop 68 which also encloses a tapped bar 69. By means of bolts 70 mounted in a rib 71 of the drum 63 and engaging tapped holes on the bar 69 the proper tension may be put on the sheet metal blanket 66.

Figure 11:
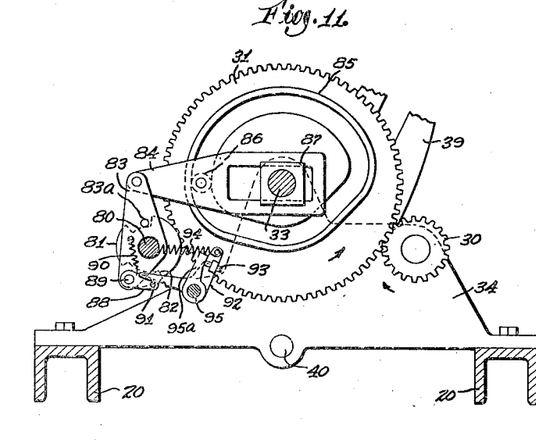
Figure 11 represents a section on line 11—11 of Figure 4.
Figures 12, 13, 14:
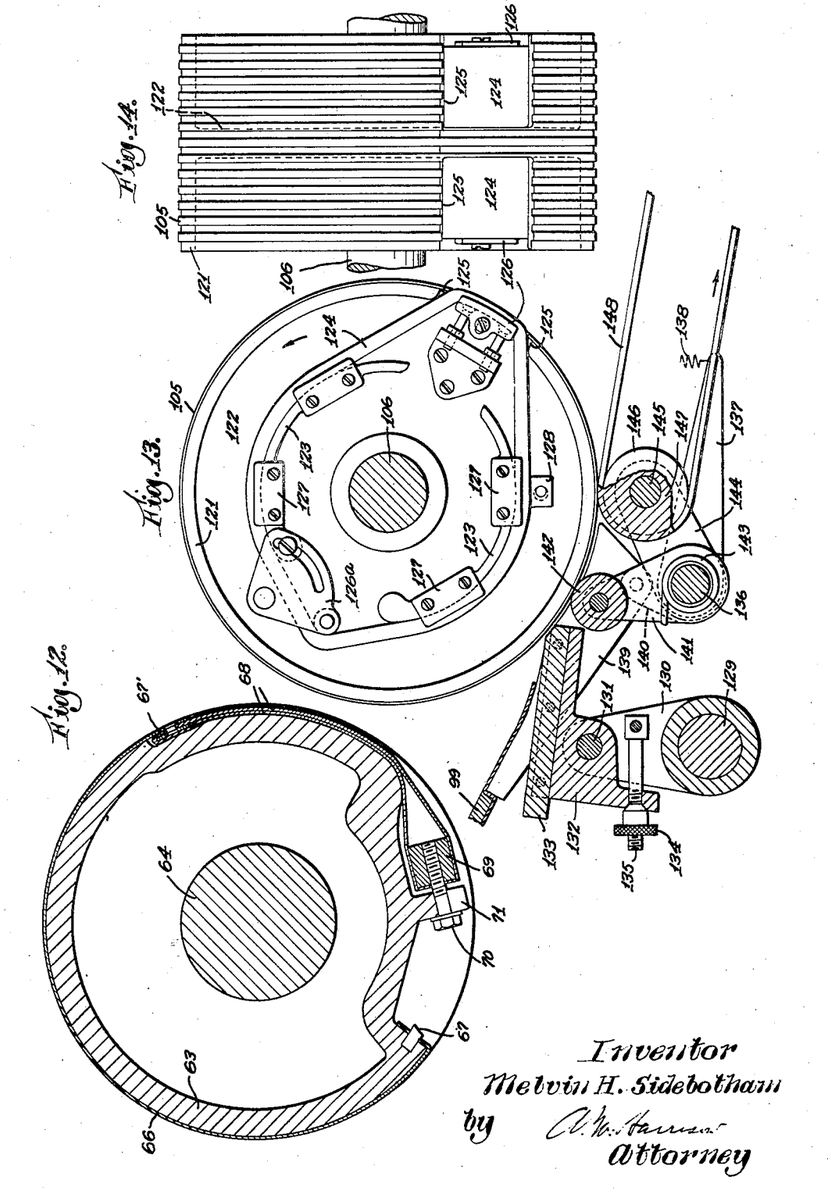
Figure 12 represents an enlarged cross section of the backing-up drum.
Figure 13 represents an enlarged cross section of the combing feed wheel.
Figure 14 represents an enlarged elevation of the combing feed wheel.

The ends of the drum shaft 64 are mounted in bearing blocks 72 (Figs. 2 and 4) slidable in vertical ways 73 in the side frame members 21, 22. Below the blocks 72 are springs 74, and above them are eccentric sleeves 75 that bear on shoes 76 interposed between them and the blocks. The eccentric sleeves 75 are keyed on stub shafts 77 each of which has an arm 78 secured to its outer end. Each arm 78 is connected by a link 78a to an arm 79 of a shaft 80 which, as shown in Figure 4, extends across the lower part of the machine and has a notched wheel 81 (Fig. 11) secured to it. Said wheel 81 is hereinafter referred to as a ratchet wheel.

A pawl 82 actuates the shaft 80 in one direction so as to act through the arms 79 and links 78a and the described members which support the drum shaft 64, to lower the drum 63 against the lifting springs 74. Said pawl 82 is pivoted to an arm 83 loosely mounted on the shaft 80 and oscillated by means of a link 84 pivotally connected to the upper end of said arm 83. The link 84 is reciprocated by means of a roll 86 carried thereby engaging a cam groove in a disk 85 carried by the shaft 33. Said link is guided on a block 87 loosely mounted on the shaft 33. Rotation of the shaft 33 effects, through the mechanism described, a partial rotation of the shaft 80 and, through the arms 79, links 78a, levers or arms 78 and eccentrics 75, causes a depression of the drum 63, said drum being raised by the springs 74 when rotation of the shaft 80 is reversed by the mechanism which will now be described.

To effect such reversal, so that the springs 74 will lift the drum 63, a pin 83ª projects from the arm 83 into the upper notch of the ratchet wheel 81. The described pawl 82 projects from a stub shaft 89 mounted in the arm 83, and said shaft 89 also has a fixed arm 88 to which a spring 90 is connected, said spring tending to keep both the arm 78 and the pawl 82 in the position illustrated in Figure 11. The arm 88 has a lateral pin 91 the purpose of which will be presently described.

A bell crank lever 92 is mounted on a shaft 95 journalled in the frame 22 and in an adjacent bracket 34 (Fig. 4), and one arm of said lever carries a screw 93 and has a spring 94 connected to it, said spring having a greater pulling strength than the described spring 90. The other arm or finger of the bell crank lever extends over the pin 91 to actuate the shaft 89 to release the pawl 82 from the ratchet wheel. The shaft 95 has a fixed arm 95ª extending up and into the path of the screw 93.

The end of the shaft 95 outside the frame member 22 (Figs. 1 and 4) has an arm 96 which is connected by a link 97 to a manually-operable lever 98. Ordinarily this lever 98 occupies the position shown in Figure 1, and the bell crank lever 92 is prevented from operating. If said lever is released, however, the spring 94 can then actuate the bell crank lever in a counter-clockwise direction as viewed in Figure 11. Then the other arm of the bell crank will act on the pin 91 and cause a rotation of the shaft 89 so as to disengage the pawl 82 from the ratchet wheel 81. This mechanism is to permit the disconnection of the drum-depressing means while the machine is still running, if circumstances render it necessary to prevent injury to dies carried by the platen without having to stop the entire machine.

Sheets of material which are to be converted into cut or creased blanks, are fed singly and successively from an inclined table (Figs. 1, 2, 5 and 6) comprising bottom or floor strips 99 mounted on tie rods 100 supported by the side plates 101 which are pivotally connected to frame members 102. The sheets are confined between side plates 103 which are adjustable to accommodate different sizes of sheets to be fed. The angle of inclination of the table is adjustably determined by means of a screw 104 as is customary in such machines.

Figure 2:
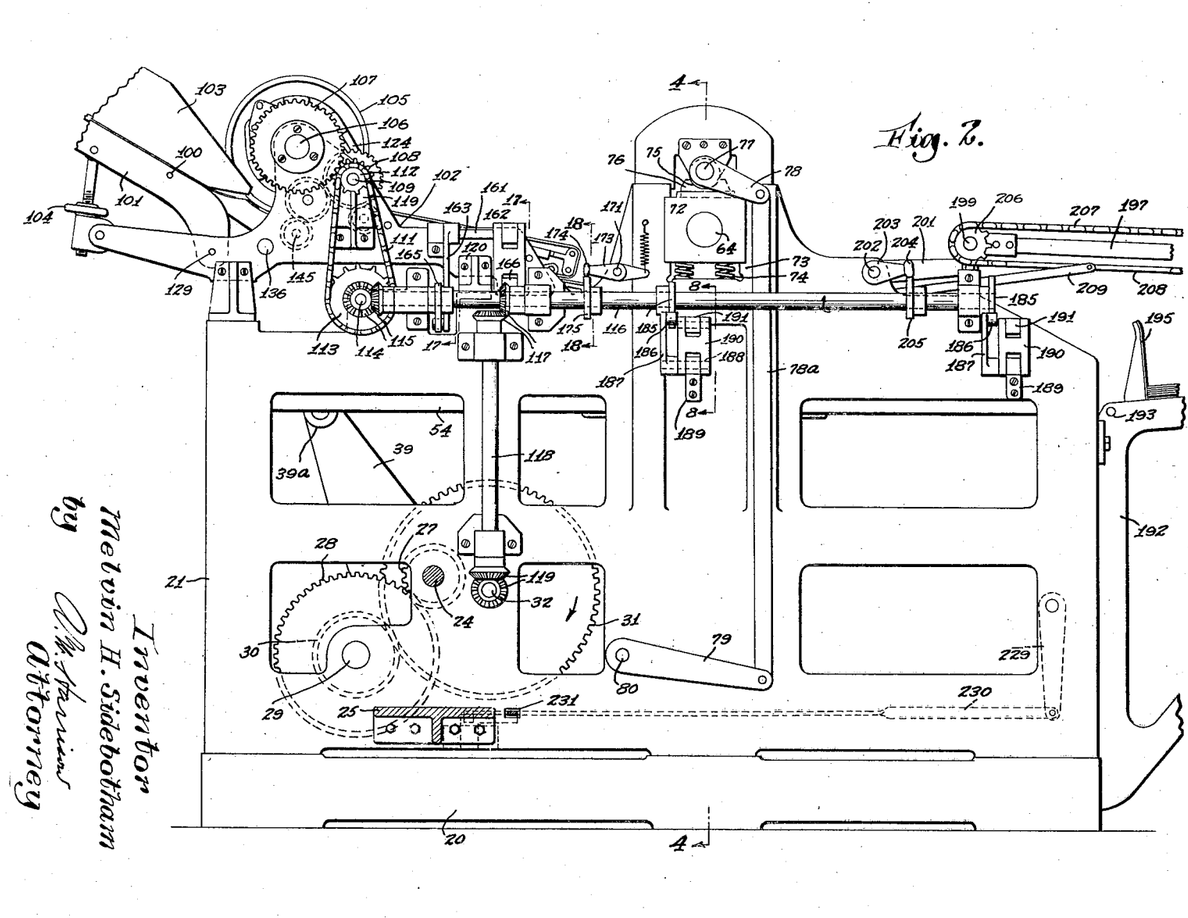
Figure 2 is a partial right side elevation.

A combing wheel 105 transfers the sheets A singly (Figs. 5 and 16) from the inclined table to conveyor belts which deliver each one to position where it is gripped and temporarily held on the chase 43. Said combing wheel is carried by a shaft 106 which is driven by gearing including spur gears 107, 108, (Fig. 2), the latter being carried by the shaft 109 which is mounted in bearings provided in the right hand frame member 102 and a bracket 110 (Fig. 3). Said shaft 109 is driven by a chain 111 and sprockets 112, 113, the latter being mounted on the shaft 114. Said shaft 114 is driven by a pair of bevel gears 115 from the cam-carrying shaft 116 which, in turn, is driven by bevel gears 117 from a vertical shaft 118 (Fig. 2). Bevel gears 119 connect the shaft 118 with the shaft 32.

The combing wheel 105 (Figs. 5, 6, 13 and 14) comprises a drum 121 integral with a disk 122 having a hub portion mounted on the shaft 106. The drum is hollow except for its disk portion 122. Inside the drum arcuate ribs 123 project from opposite faces of the disk portion, said ribs supporting two endless belts 124 of rubber or equivalent frictional material. Two openings 125 are provided in the ribbed periphery of the drum, and internal adjustable plates 126 over which the belts 124 pass, said plates being just inside the openings 125, maintain limited areas of the belts so exposed as to act as timed feeders for the sheets A.

Opposite the openings 125 in the drum (Fig. 13) are suitable tensioning devices 126ª to take up slack in the belts, and suitable cleats 127 guide the belts and hold their inner edges against the central disk portion 122. To prevent each belt from slipping, a suitable clamping device 128 is mounted opposite one or more of the guiding cleats 127.

To guide the sheets from the table to the combing wheel, the following mechanism is provided:—

A shaft 129 (Figs. 5, 6 and 13) mounted in the side plates 101 carries a forked member 130 having a pin 131 on which is mounted a bracket 132 having a throat piece 133 on its top and just under flat strips leading down from the table. By means of a nut 134 on the threaded stud 135 connecting the bracket 132 and member 130, the throat piece 133 can be adjusted to vary the space between the piece 133 and the combing wheel to suit the thickness of the stock of sheets being operated upon.

At a point farther under the combing wheel is a shaft 136 having fixed to its arms 137 which are normally urged upwardly by springs 138. Thin spaced guiding blades 139 (Figs. 3, 6 and 13) are supported by arms 140 projecting upwardly from and secured to the shaft 136. Also mounted on the shaft 136 are arms 141 supporting a roll 142 which is yieldingly held against the combing wheel by a torsion spring 143. Fixed to the shaft 136 near its ends (Fig. 3) are two arms 144 which carry a shaft 145. On said shaft are six pulleys 146 for the conveyor belts presently described, and also a roll 147 under the combing wheel, said roll being illustrated in Figure 13 as partially broken away. As the springs 138 act, through the arms 137, to urge the arms 144 of the shaft 136 upwardly, the roll 147 is maintained yieldingly against the combing wheel. The shaft 145 is rotated from the shaft 109 by a train of gearing indicated by dotted lines in Figure 2.

Mounted on the pulleys 146 are belts 148 (Figs. 5, 6 and 13) the other ends of which are mounted on pulleys 149 carried by strip brackets 150 adjustably mounted in brackets 152 fixed on a tie rod 153 and also carrying idler pulleys 151. The belts 148 serve as the lower or under carriers for the sheets fed by the combing wheel.

Above the belts 148 is a shaft 154 carrying six pulleys 155 spaced like the pulleys 146. Belts 156 are supported at one end on said pulleys 155 and at the other end on pulleys 157 carried by brackets 158 adjustably supported by socket members 159 fixed to a tie rod 160. The shaft 154 is driven from the shaft 109 by gearing not necessary to illustrate in detail.

Figures 17, 18:
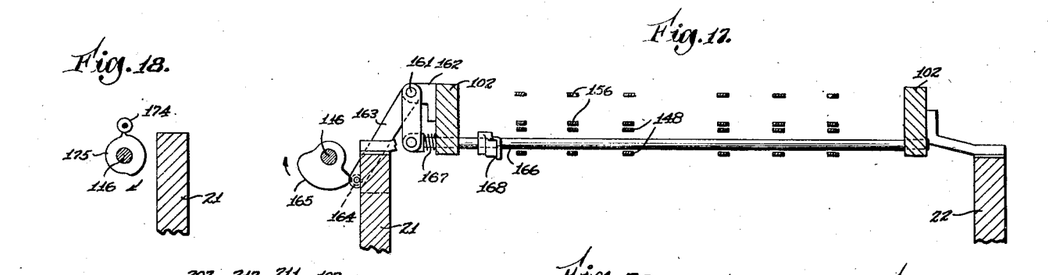
Figure 17 represents a section on line 17—17 of Figure 2.
Figure 18 represents a partial cross section on line 18—18 of Figure 2.

A short shaft 161 (Figs. 2, 3 and 17) is mounted in bearing brackets 162 supported by the right hand frame member 102, and said shaft has an arm 163 provided with a roll 164 contacting with a cam 165 carried by the shaft 116. The shaft 161 has another arm connected to one end of a transverse slide rod 166 mounted in the frame members 102, and a spring 167 interposed between the last-mentioned arm and one of the members 102 serves to maintain the roll 164 in contact with the cam 165. Adjustably mounted on the slide rod 166 is a flat member 168 which serves as a pusher or jogger against the sheets that are being advanced toward the platen by the lower and upper belts 148, 156. That is, each rotation of the cam 165 causes an inward movement of the slide rod in time with the arrival of a sheet alongside the pusher 168, so that if such sheet is not in accurate lateral position relatively to the platen, it will be properly lined up by said pusher.

Fingers 169 extending from the brackets 150 (Figs. 3, 5 and 6) aid in supporting the sheets as they leave the carrying belts, while each sheet arriving between the said belts is directed down by guides 170.

To temporarily arrest each sheet leaving the carrying belts, until it is gripped on the platen as presently described, a rock shaft 171 (Figs. 2, 3, 5 and 6) carrying hook-shaped members 172 extends transversely of the machine and has at one end an arm 173 provided with a roll 174 (Fig. 18) bearing on a cam 175 carried by the shaft 116. Another arm of the rock shaft has a spring connected to it, so that each timed rotation of the shaft 116 will cause its cam 175 to so rock the shaft 171 that its hook members 172 will move to and from position to first arrest an arriving sheet and then permit it to pass.

Figure 5:
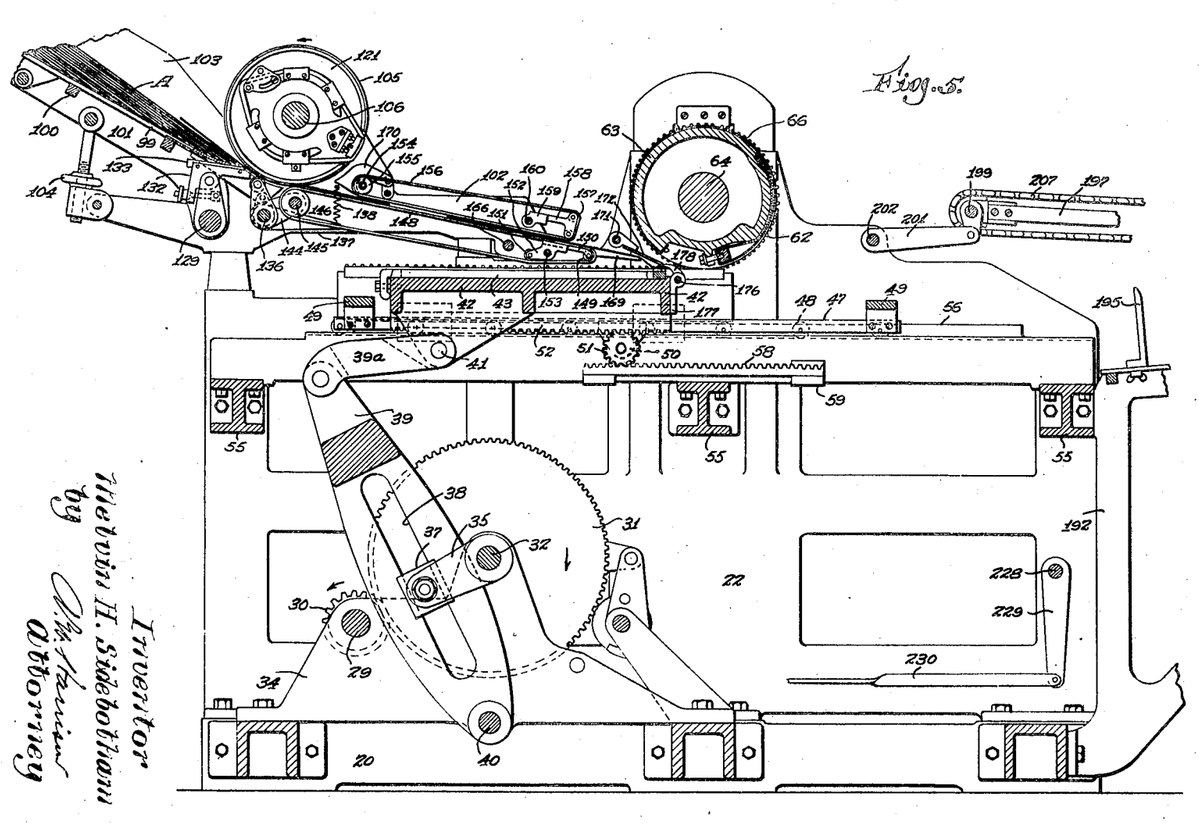
Figure 5 represents a longitudinal section on the line 5—5 of Figure 4.

Figure 5 illustrates the position of the members 172 when they are down but ready to move up to inactive position. At this time, the platen is in its retracted position to receive the fed sheet. The gripping or nipping devices which take hold of the sheet and pull the sheet away from the belts 148, 156, when the platen moves toward the position illustrated in Figure 6, will now be described.

Figure 8:
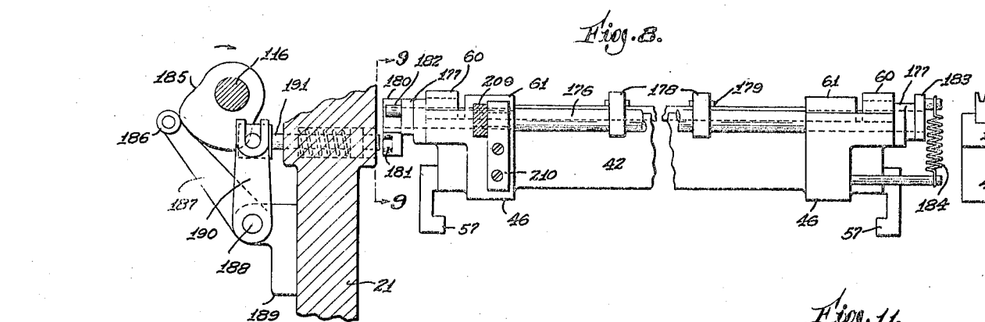
Figure 8 represents a section on line 8—8 of Figure 2, on a larger scale.
Figure 10:
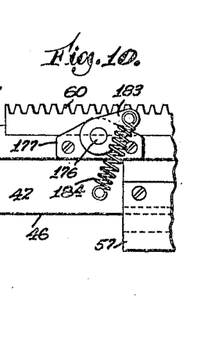
Figure 10 is a right-hand elevation of the parts shown in Figure 8.

On the rearward end of the platen 42 is mounted a rock shaft 176 in bearing brackets 177 (Figs. 3, 4, 5 and 6), said shaft having nipping fingers 178 to coact with lugs 179 (Figs. 4 and 8) at the rear top surface of the chase. At one end the rock shaft 176 has an arm 180 (Figs. 8 and 9) in the outer face of which is a groove 181. Pins or screws 182 projecting from one of the bearings 177 limit the amount of oscillation of the rock shaft 176. The other end of the rock shaft 176 has an arm 183 (Figs. 8 and 10) to which a spring 184 is connected the tension of said spring tending to hold the shaft 176 at one extremity or the other of its rocking movements, said spring therefore tending to hold the nipper fingers 178 down on the chase lugs 179 as shown in Figure 7, or raised therefrom, according to which way the shaft 176 has been rocked by the mechanism presently described.

Secured to the shaft 116 is a cam 185 (Figs. 2, 3, 4 and 8) against which a roll 186 bears, said roll being carried by an arm 187 of a short shaft 188 mounted in a bearing of a bracket 189. Said shaft also has an arm 190 the forked upper end of which embraces a pin projecting from the outer end of a plunger 191 mounted in the side frame member 21. A suitable spring around the plunger and illustrated by dotted lines in Figure 8 tends to press the plunger toward the grooved arm 180 of the rock shaft 176, and also to hold the roll 186 of the arm 187 against the cam 185.

The operation of this mechanism is as follows:—

The relative timing is such that when the platen approaches the position illustrated in Figure 5, and with the nippers 178 raised, the lesser portion of the cam 185 is then permitting the plunger 191 to be shifted by its spring to such position that the inner end of said plunger is in the path of the approaching grooved arm 180 of the nipper rock shaft 176. Then, as the platen approaches the end of the just-described movement, the groove 181 of the arm 180 engages the end of the plunger 191, and the last part of the said movement of the platen causes the arm to swing from the left dotted line position of Figure 9 down to the vertical dotted line position and past it far enough to permit the spring 184 to complete the rocking movement of the nipper shaft 176. During the last part of the movement described, the high portion of the cam 185 effects the withdrawal of the plunger 191 so that the nipper shaft is free to be actuated solely by the spring 184 in a direction to cause the fingers to yieldingly grip the edge of the sheet that has been fed onto the chase. This yielding grip continues during the return of the platen with the sheet thereon, under the drum 63, to the position shown in Figure 6. It is to be understood, of course, that during the last-mentioned movement, and during which the sheet borne by the chase is cut or creased, or both, the plunger 191 is still held retracted by the high portion of the cam 185, so that said plunger will not cause the opening of the nippers during the travel of the platen toward the Figure 6 position.

As illustrated in Figures 2 and 3, there are two duplicate cams 185 carried by the shaft 116 and the parts associated therewith. The detailed mechanism, just described constitutes what actuates the nipper shaft 176 when the platen is in the Figure 5 position. When the platen approaches and is in the Figure 6 position, members which are duplicates of those shown in Figures 8, 9 and 10 effect the rocking of the shaft 176 in the other direction, to open the nippers and release the sheet which has been operated on by the joint action of the die-carrying platen and the drum 63.

The mechanism for lifting and removing each cut or creased sheet from the platen and its dies, and depositing them successively in a stacked pile, will now be described.

At the rear or delivery end of the machine is a stacker frame consisting of brackets 192 (Fig. 1) bolted to the main frame members and connected together by tie rods 193. Said tie rods support strips 194 (Figs. 3 and 19) which form a floor or platform and four upright wall members 195 (Fig. 1) coact with the floor strips in providing a rectangular receptacle for the cut sheets delivered thereto by the mechanism presently described.

Figure 1:
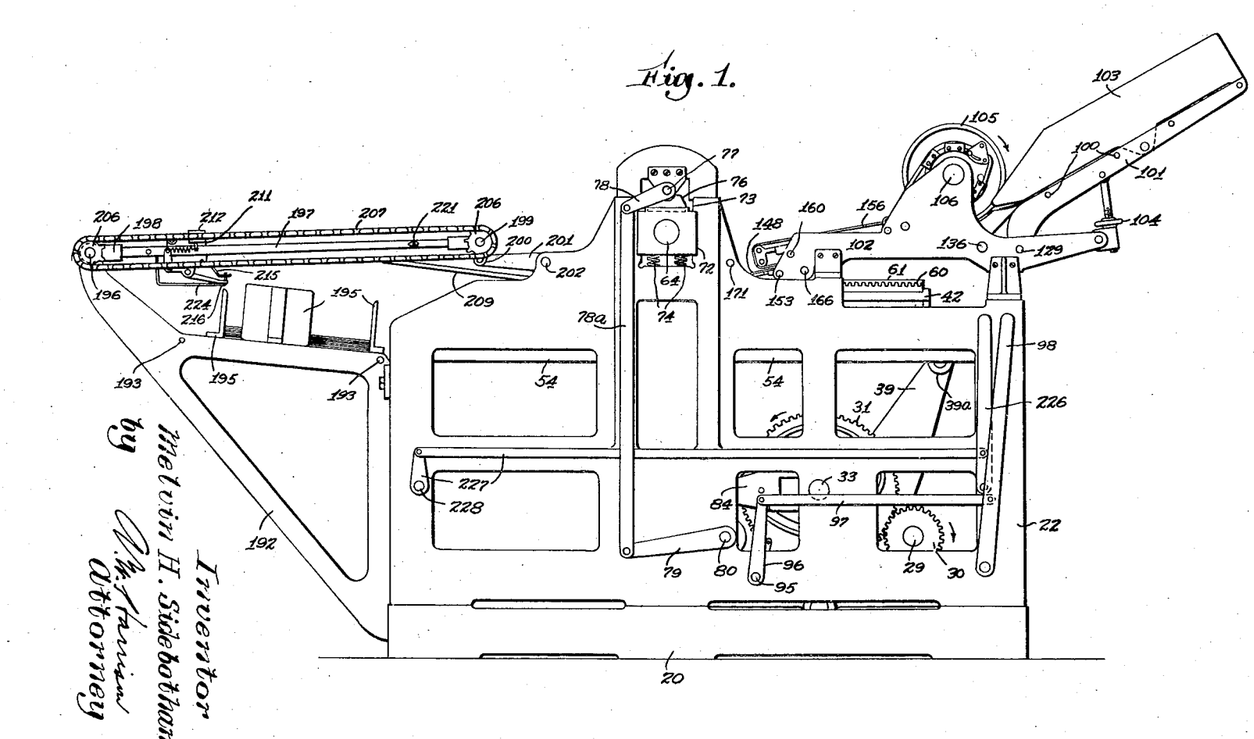
Figure 1 is a left side elevation of the machine.
Figure 19:
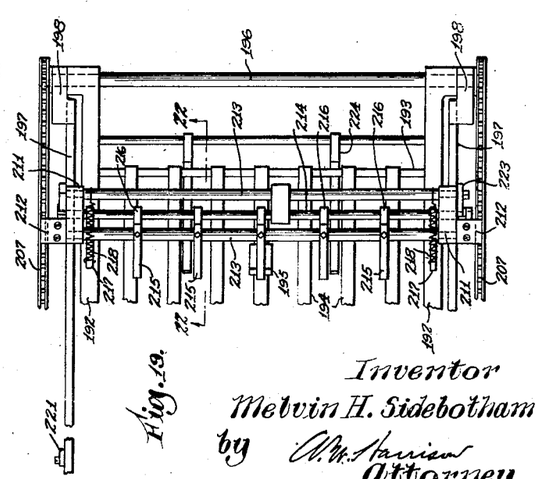
Figure 19 is a plan view of the portion of the taking-off mechanism that is broken away in Figure 3.
Figures 20, 21, 22, 23:
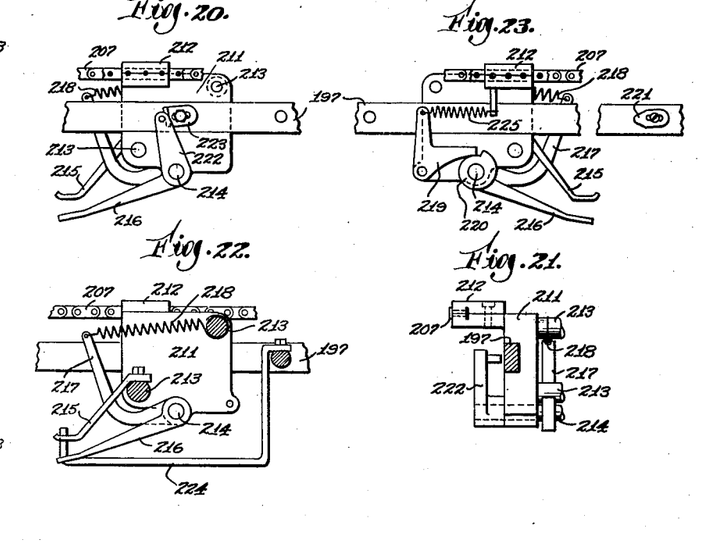
Figure 20 is a detail right side elevation of the take-off mechanism.
Figure 21 is a right end elevation of Figure 20.
Figure 22 represents an enlarged cross section on the line 22—22 of Figure 19.
Figure 23 is a detail view of parts shown in Figure 20, looking in the opposite direction.

Mounted in the outer or rearward extremity of the brackets 192 is a shaft 196 on which two guide rails 197 are pivotally mounted by the bearings 198 (Figs. 1 and 19). The inner forward ends of the rails 197 have bearings for a shaft 199 on which are mounted two links 200 connected to arms 201 of a rock shaft 202 (Figs. 2, 3, 5 and 6). Secured to one end of the said rock shaft is an arm 203 having a roll 204 riding on a cam 205 of the shaft 116. This structure effects the intermittent and timed raising and lowering of the inner ends of the guide rails 197 and the parts carried thereby.

The shafts 196, 199, carry sprockets 206 on which chains 207 are mounted, and one of said chains (Fig. 2) has a long link or bar 208 in its lower reach. Said bar is connected by a link 150

209 to a bracket 210 secured to the platen 42 (Figs. 7 and 8) so that reciprocation of the platen effects, through the link 209 and one of the chains, alternate rotations of the shaft 199 first in one direction and then in the other direction, so that the sprockets of said shaft cause both chains 207 to reciprocate.

Figure 6:
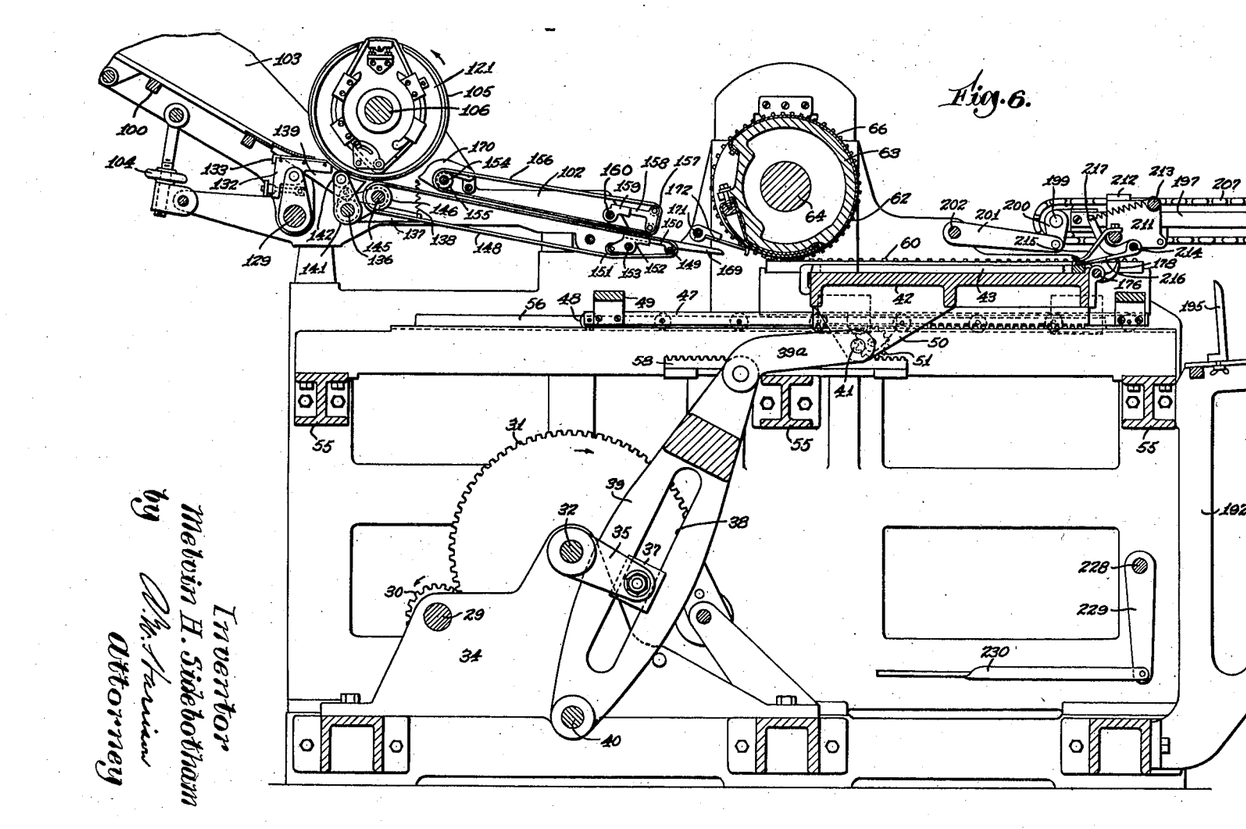
Figure 6 is a view similar to Figure 5, showing parts of the machine in other positions of operation.

Slidably mounted on each guide bar 197 (Figs. 1 and 6) is a carriage 211 carrying members which, when the platen reaches the position illustrated in Figure 6, take hold of the cut sheet and lift it from the platen dies and remove it therefrom and drop it in the stacker receptacle. Said carriages and their members are more fully illustrated in Figures 19 to 23.

The two carriages 211 are connected to the upper reaches of the two chains by clamp blocks 212, and the two carriages are connected together by tie rods 213. A rock shaft 214 is mounted in the two carriages. Mounted on the lower tie rod 213 are stationary fingers 215, and the rock shaft 214 has nipping fingers 216 extending under the fingers 215.

The rock shaft 214 has arms 217 connected by springs 218 with the upper tie bar 213, said springs tending to close the nippers 216 against the fingers 215.

A pawl 219 pivoted to one of the carriages (Fig. 23) engages a shouldered disk 220 fixed to the shaft 214, and a stop 221 adjustably secured to one of the guide rails 197 near the inner end thereof (Fig. 1) is in the path of movement of the upper arm of the pawl when the reciprocating platen and the reciprocating carriages meet as illustrated by Figure 6. This releases the pawl from the shoulder of the disk 220 and the springs 218 then act to rock the shaft 214 and cause the nipping fingers 216 to lift the edge of the sheet from the die platen and grip it against the upper fingers 215. The timing is such that the direction of travel of the chains 207 is then reversed and the sheet is carried rearwardly in a somewhat floating manner, until an arm 222 of the rock shaft 214 (Fig. 20) comes in contact with a lug 223 adjustably mounted on one of the rails 197, which causes the nipping fingers to open. At this time the advancing edge of the sheet contacts with the up-turned ends of the wire or rod stop member 224 supported by a transverse bar mounted in the rails 197 (Fig. 22) so that the released sheet is free to fall into the stacker receptacle. At the same time, a spring 225 (Fig. 23) connected with the upper arm of the pawl 219 causes said pawl to snap in behind the shoulder or tooth of the disk 220 so as to hold the nippers open until the carriages return to position to take another sheet from the platen.

For starting and stopping the machine, the following mechanism may be utilized:—A hand lever 226 (Figs. 1 and 3) is connected by a link and arm 227 to a shaft 228 which (Fig. 6) has another arm 229 connected by a link 230 to one arm of a bell-crank lever 231 (Figs. 2 and 4) the other arm of which is connected by a link 232 to an arm or lever 233 having a fork operatively engaging the outer member of the clutch 26.

The operation of the machine as a whole, is as follows:— The sheets A are placed on the inclined table and are fed singly and successively by the combing wheel 105 over the throat piece 133 and rolls 142 and 147, and between the carrier belts 148, 156. Said belts carry each sheet downward and rearward until it reaches the hook-shaped members 172. If the sheet is in incorrect lateral position, it is shifted to correct position by the pusher 168. The platen 42 moves forward under the belts to the position illustrated in Figure 5, and the nippers 178 grip the sheet as the arresting members 172 rise, and then as the platen moves back under the drum 63, drawing the sheet along with it, the dies carried by the chase effect the cutting and creasing of the sheet due to the rolling pressure of the oscillatory drum.

When the platen reaches the end of its rearward travel, the nippers 178 automatically release the sheet, as has been described, and the fingers 216, 215 of the carriages 211 take hold of the released edge of the sheet, lifting it slightly, and then as the platen returns forwardly and the carriages move rearwardly, the sheet is drawn positively through the air until it arrives over the stacking receptacle, whereupon it is released and allowed to lightly fall.

All of the gearing employed in the machine is of a type, and of such proportions, as to ensure correct relative timing of the successive operations as just described. The machine has, practically, no lost motions. When the platen is travelling in one direction and carrying a sheet that is being operated on, the parts that have discharged a previous sheet are moving to position to meet the approaching platen. And at the same time, the feeder is starting another sheet toward the platen. Then while the treated sheet is being transported to the stacker receptacle, the platen is returning to take the new sheet that is being fed. Therefore no part of the machine is idle while some work is being done by other parts of the machine.

Figures 2, 15, 16:
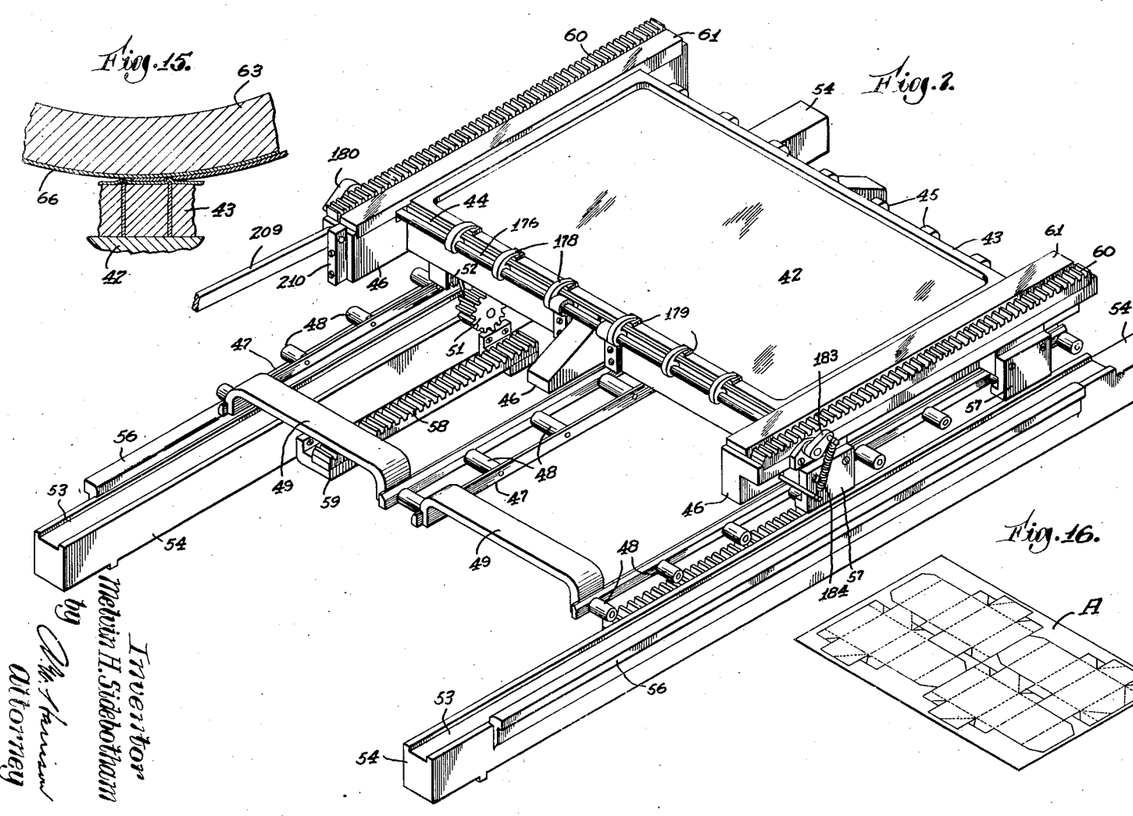
Figure 15 represents an enlarged cross sectional detail view to illustrate the cutting and creasing operations.
Figure 16 is a perspective view of a typical blank showing the cutting and creasing lines.
Figure 3:
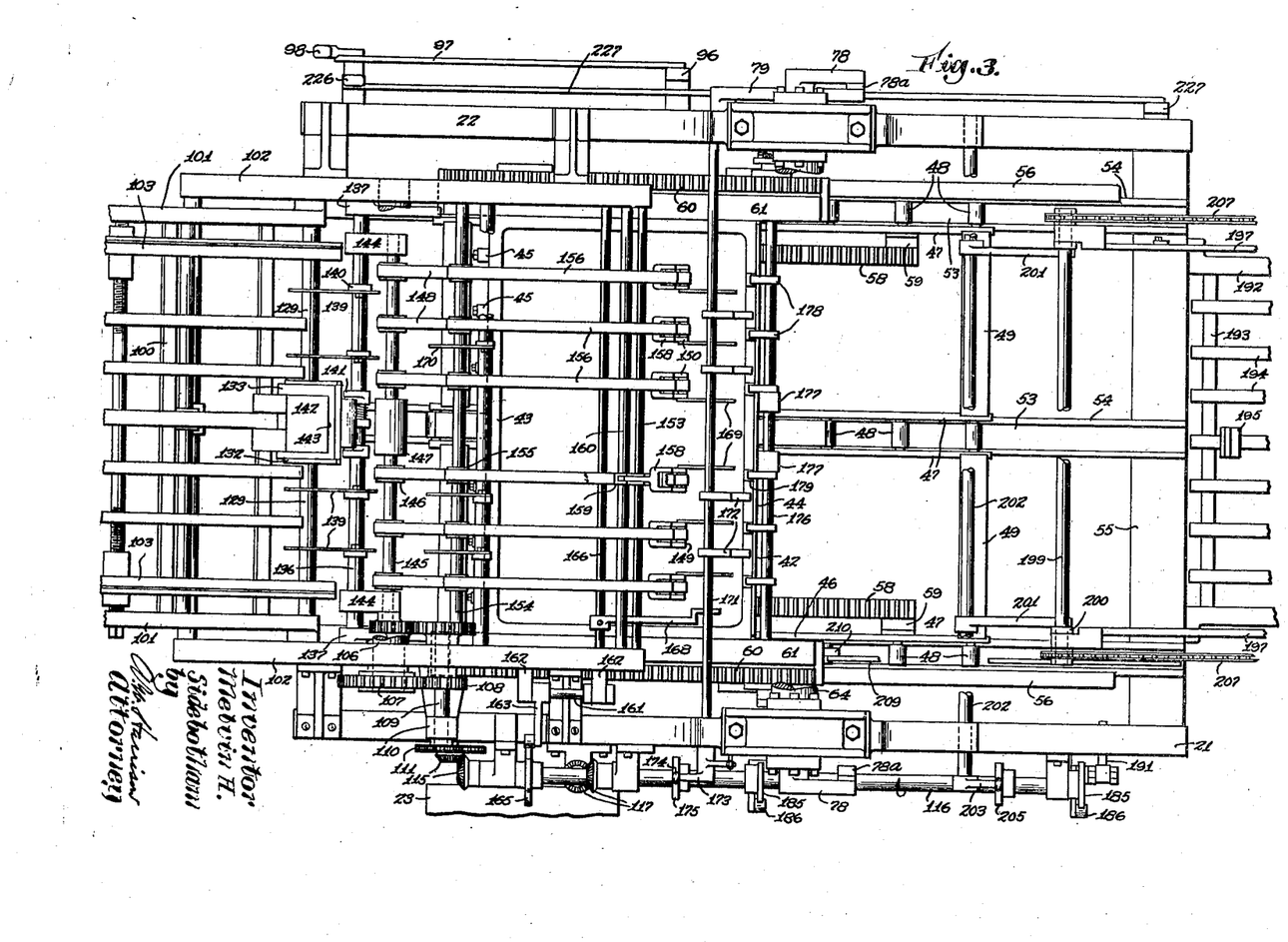
Figure 3 is a partial plan view, omitting the feed roll mechanism and the platen.

In Figure 16 which illustrates a sheet which has been cut and creased to provide four box blanks that are foldable on their crease lines, the cuts or slits are illustrated by continuous lines, and the creased lines by dotted lines.

While I have described the machine as adapted to simultaneously effect both cutting and creasing, and have included the word creasing in the title of the machine, it is to be understood that when the articles to be cut from the sheets are of a nature requiring no creases, then the reciprocating platen will be provided only with the required cutting dies. Therefore I do not limit myself to the use of the machine for effecting both cutting and creasing.

Having now described my invention, I claim:—

1. A cutting and creasing machine having a reciprocatory die-carrying bed means for automatically feeding sheets singly to said bed and registering them thereon, and means for pressing the sheet on said bed during movement thereof.

2. A cutting and creasing machine having a reciprocatory die-carrying bed provided with sheet-holding nippers, means for actuating said nippers at the end of movement of the bed in one direction to cause them to grip a sheet, means for automatically feeding sheets singly to said bed and registering them thereon, and means for pressing the sheet on the bed during movement thereof in the other direction.

3. A cutting and creasing machine having a reciprocatory die-carrying bed provided with sheet-holding nippers, means for actuating said nippers at the end of movement of the bed in one direction to cause them to grip a sheet, means for automatically feeding sheets singly to said bed and registering them thereon, and a pressing roll in position to bear on the sheet during movement of the bed in the other direction.

4. A cutting and creasing machine having a reciprocatory die-carrying bed provided with sheet-holding nippers, means for automatically feeding sheets singly to said bed and registering them thereon, and an oscillatory pressing roll above said bed, said roll and bed having intermeshing toothed gears and racks.

5. A machine of the character described, comprising a reciprocatory bed, means for automatically supplying sheets to the surface of the bed at one end of its stroke, means for automatically registering each sheet in position on said bed, a pressing roll to bear on the sheets carried by said bed, and means for automatically removing the sheets from the bed at the other end of its stroke.

6. A machine of the character described, comprising a reciprocatory bed, means for automatically supplying sheets singly to accurate position on the surface of the bed at one end of its stroke, a pressing roll to bear on the sheets carried by said bed, said bed and roll being geared together, and means for automatically removing the sheets from the bed at the other end of its stroke.

7. A cutting and creasing machine, comprising a reciprocatory bed, means for automatically supplying a sheet to the surface of the bed at one end of each of its strokes, a laterally operative pusher for acting on each sheet being fed to effect registration of the sheet with the bed, a roll above the bed, and means for removing each sheet from the bed at the other end of its stroke.

8. A machine of the character described, comprising a reciprocatory bed having nippers at its forward edge, means for automatically feeding sheets singly onto the bed while the bed is at the rearward end of its stroke, means for actuating said nippers to cause them to grip the sheet fed onto the bed, means for releasing said nippers at the other or forward end of the stroke of the bed, and means for positively withdrawing each sheet released by said nippers.

9. A machine of the character described, comprising a reciprocatory bed having nippers at its forward edge, means for automatically feeding sheets singly onto the bed while the bed is at the rearward end of its stroke, a movable stop mechanism for arresting each fed sheet in position to register with the bed, means for actuating said nippers to cause them to grip the sheet fed onto the bed, means for releasing said nippers at the other or forward end of the stroke of the bed, and means for positively withdrawing each sheet released by said nippers.

10. A cutting and creasing machine having a reciprocatory die-carrying bed, means for automatically supplying sheets singly to the surface of the bed at one end of its stroke, means for registering the position of each sheet supplied to the bed, a pressing roll to bear on each sheet carried by said bed, and means for lifting each sheet from the dies of the bed at the other end of the stroke of the bed.

11. A cutting and creasing machine having a reciprocatory die-carrying bed, means for automatically supplying sheets singly to the surface of the bed at one end of its stroke, means for registering the position of each sheet supplied to the bed, a pressing roll to bear on each sheet carried by said bed, means for lifting each sheet from the dies of the bed at the other end of the stroke of the bed, a receiver for the cut and creased sheets, and means for positively transporting each lifted sheet to position over said receiver.

12. A cutting and creasing machine having a reciprocatory die-carrying bed, means for automatically delivering sheets singly thereto, means for pressing each sheet on the bed during movement thereof, and means for lifting each sheet from the bed and positively transporting it away therefrom in a floating manner.

13. A cutting and creasing machine having a reciprocatory die-carrying bed, means for automatically delivering sheets singly thereto, means for pressing each sheet on the bed during the movement thereof, a receiver for the sheets operated upon, and means for lifting each sheet from the bed and positively transporting it through the air to position over said receiver and releasing it.

14. A machine of the character described including a reciprocatory die-carrying bed, means for feeding sheets singly and successively to the bed while the bed is approaching the feeding means, means for separating the sheet from the bed when the latter reaches its position farthest from the feeding means, and reciprocatory sheet-gripping mechanism timed to transport said separated sheet while the bed is returning toward the feeding means.

15. In a machine having a reciprocatory die-carrying bed, a support for a pile of sheets, a combing wheel for removing sheets singly and successively from the pile and feeding them to the bed in timed relationship with the reciprocations of said bed, and means for automatically registering each sheet in position on the bed.

16. In a machine having a reciprocatory die-carrying bed, provided with means for alternately gripping a sheet thereon and releasing it and positively removing it therefrom, a support for a pile of sheets, and a combing wheel for removing sheets singly and successively from the pile and feeding them to the bed in timed relationship with the reciprocations of said bed.

17. A cutting and creasing machine having a reciprocatory die-carrying bed, a cylinder having means for co-acting with the dies to cut and crease a sheet carried by the bed, and means for separating each sheet from the bed while the bed is stationary at the end of its operating movement.

18. A machine for cutting or creasing sheet material, said machine including a reciprocating die-carrying bed, a make-ready cylinder above the bed for pressing a sheet on the bed during movement thereof, and means for registering sheets on the bed, said bed and cylinder being geared together and relatively proportioned to cause the cylinder to effect approximately a single revolution during each reciprocating movement of the bed.

MELVIN H. SIDEBOTHAM.